March 19, 1940.   H. R. MINOR   2,194,364
SPONGE RUBBER PRODUCT
Filed April 16, 1937
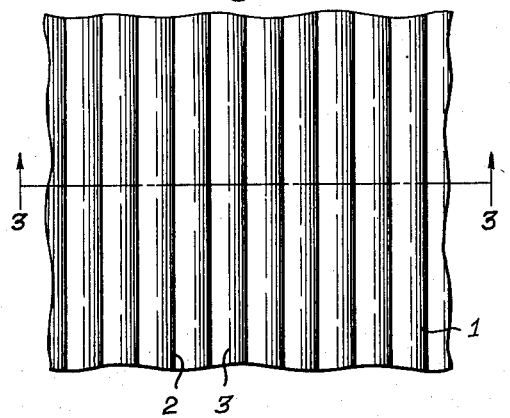
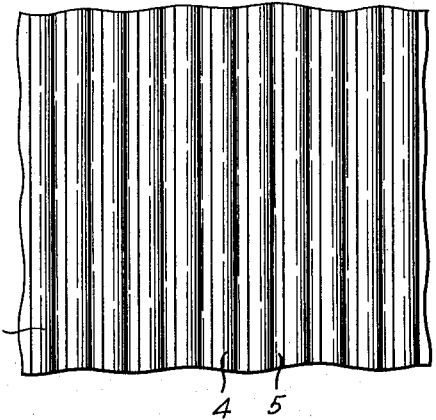
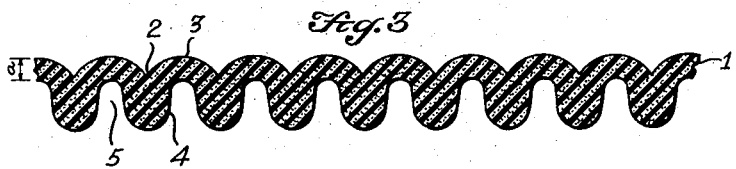
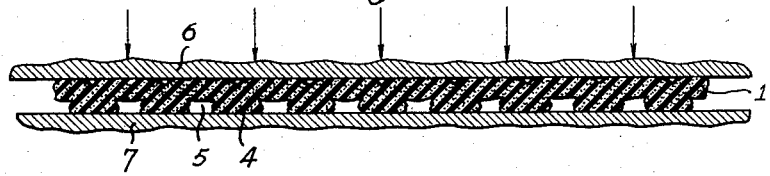
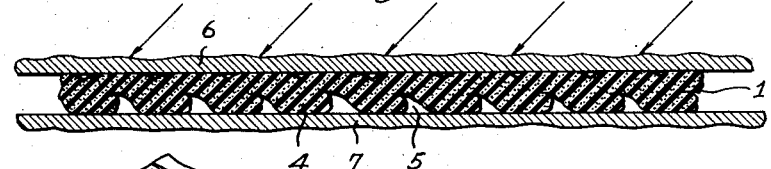
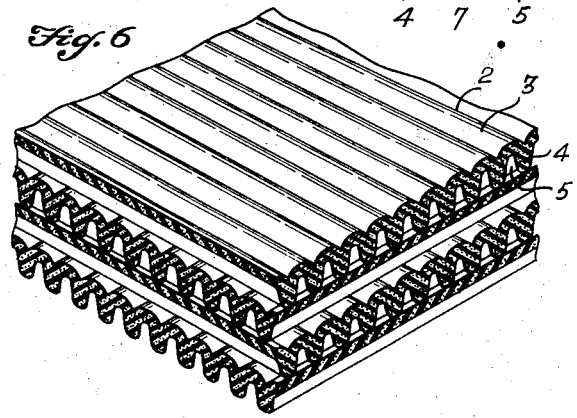
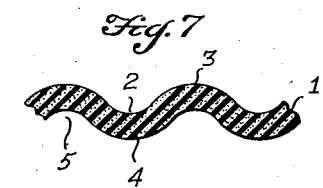
INVENTOR
HENRY R. MINOR
BY
ATTORNEYS Patented Mar. 19, 1940

2,194,364

UNITED STATES PATENT OFFICE 2,194,364

SPONGE RUBBER PRODUCT

Henry R. Minor, Dayton, Ohio, assignor to Industrial Process Corporation, Dayton, Ohio, a corporation of New York Application April 16, 1937, Serial No. 137,322

5 Claims. (Cl. 154—55)

My invention relates to sponge rubber products and in particular to a sheet or a plurality of sheets of corrugated sponge rubber.

It is my object to provide a sponge rubber product in sheet form which can be used in a single layer or in multiple layers as a carpet lining for use on upholstery or in any other type of use.

It is an object of my invention to provide in a sponge rubber body a plurality of ribs of rubber closely adjacent to one another in parallelism with narrow air spaces between the ribs so that the entrapped air will act as a cushion to cooperate with the sponge rubber. When a plurality of layers of corrugated sponge rubber are mounted on one another with the ribs at right angles to one another, there are a plurality of these air spaces with air channels angularly disposed so that there is a continuous cushion of air and a continuous cushion of sponge rubber beneath the supported object and over the supporting object.

It is a further object to provide a product that will resist lateral movement so that carpets and rugs lying on this sponge rubber product will not move laterally and slide upon a floor.

The special object of my invention is to provide with a given thickness of sponge rubber a thickness of rubber mat many times the thickness of the sponge so that the effect of a very thick rubber sponge is secured with a very thin rubber sponge, thereby reducing the amount of rubber that must be employed and the cost thereof.

It is a further object to provide a corrugated rubber sponge sheet which has deep corrugations on one side to form air chambers and relatively shallow corrugations on the other side to form a surface to resist the slipping of a carpet or other covering over the sponge rubber.

This product may be formed in a sheet, a tube, or in any other desired configuration.

Referring to the drawing:

Figure 1 is a top plan view of a sheet of rubber sponge having the characteristics of my invention.

Figure 2 is a bottom plan view showing the deeper corrugations.

Figure 3 is a section on the line 3—3 of Figure 1 looking in the direction of the arrows.

Figure 4 is a section on the same line showing the compression of the sheet when a vertical depressing force is applied.

Figure 5 is a similar view showing the deformation of the sheet when a diagonal or laterally directed and downwardly extending force is applied to the sheet.

Figure 6 shows a plurality of these pads of sheets arranged one on another with their corrugations at right angles to one another to form a large number of transversely arranged, angularly disposed passageways for air.

Figure 7 is a section through a modified form of sponge sheet.

It will be understood that one of the fundamental principles of my invention is the provision of a relatively thin sponge body so molded as to give the effect of a relatively thick sponge rubber body by utilizing the principle of using the entrained air between the corrugations as an additional cushioning agency and by further utilizing not only the compression of the horizontal portion of the rubber sheet but the vertical rib portions. The same amount of rubber in a flat sheet would be quickly and easily compressed and given very little protection or resilience. It would also tend to slide laterally under any lateral deflecting force.

But by making the sheet of sponge rubber with deep corrugations on the underside so that there are relatively deep air chambers formed with sponge rubber walls between them, rubber sponge of a given thickness actually has a maximum depth of several times its thickness as the ribs of the sponge are from two to three times the thickness of the sponge sheet.

Referring to the drawing in detail, I designates a sheet of rubber sponge, the thickness of which is indicated by the dimension $a$. This sponge is molded so as to have a series of depressions 2 and arch-shaped areas 3 on the upper surface to form relatively slight corrugations. This is not a fundamental of my invention as the upper surface may be smooth without corrugations, but it is a very desirable feature in some types of applications.

The underside of the sheet of sponge is formed with relatively deep ribs 4 that are from two to three times the thickness $a$ of the main sheet of sponge, thereby giving the advantage of a relatively deep body of sponge while only using sufficient rubber to make a thin sheet of sponge. When corrugated in this manner, there are deep valleys or air spaces 5 which likewise provide for resistance to downward pressure by the resistance of the compressed air which escapes through the ends of these areas 5. It will be noted that the lateral dimension of these ribs 4 is likewise approximately twice the thickness $a$, thereby giving a broad bearing surface for the sponge sheet in resisting downward pressure or lateral pressure as shown in Figures 4 and 5 respectively.

In Figure 4 the arrows indicate the pressure being applied directly downwardly, the diagrammatic cross-hatching 6 indicating some cover such as a carpet and the diagrammatic cross-hatching 7 indicating a supporting floor.

In Figure 5 the arrows are diagonally disposed, showing how the sponge rubber ribs resist the lateral thrust on the sheet. The ends of the ribs turn over into the air spaces 5, acting as additional cushions, and presenting a broad face against the floor 7 to resist lateral movement.

In Figure 6 it will be observed that a plurality of these layers have been arranged one on the other at right angles. This provides air channels at angles to one another so that a very large area of air and sponge rubber is provided from a relatively thin series of sponge sheets. As will be observed from Figure 3, the arch-shaped portions 3 bridge the recesses 5 and the ends of these bridge-like portions rest upon the relatively thick ribs 4 which act as abutments for these bridge-like portions 3.

Figure 6 has the advantage of allowing the quick entrance and exit of air to give high resilience to the rubber, which cannot be secured in rubber of equivalent thickness of the prior art where the egress and ingress of the air was so much slower, which reduced the resiliency.

It will be understood that I desire to comprehend within my invention such modifications as may be clearly embraced within the claims and scope of my invention.

Having thus fully described my invention, what I claim as new and desire to secure by Letters Patent, is:

1. A new article of manufacture comprising a corrugated body of sponge rubber including linear ribs forming corrugations with open end portions, and having deep corrugations on one side, and relatively shallow corrugations on the other side, said deep corrugations being formed of two thicknesses of rubber, having the adjacent side walls of the same permanently connected to each other.

2. A new article of manufacture comprising a corrugated body of rubber with open end corrugations extending linearly of the body, the corrugations each being of different shape on opposite sides of the body, the said corrugations on one side being relatively shallow and said corrugations on the other side being relatively deep, the said deep corrugations each being composed of two layers of rubber.

3. A new article of manufacture comprising a relatively thin sponge rubber sheet having integral linear ribs extending from side to side, the total thickness of which is greater than that of the sheet, one of the sides of the corrugated sheet having corrugations formed by two thicknesses of rubber connected integrally to each other.

4. A new article of manufacture comprising a sponged rubber sheet formed into a plurality of linear ribs arranged parallel to each other forming arch-shaped portions on one side of said sheet, and a plurality of integral linearly arranged ribs extending from side to side beneath the juncture of said arch-shaped portions, one of the sides of the corrugated body having corrugations formed by two thicknesses of rubber connected integrally to each other.

5. In combination, a plurality of layers of corrugated sponge rubber superimposed one on the other, the said corrugations of each layer forming linear ribs, each layer being relatively thin as compared with the relative thickness of the rubber, and having deep corrugations on one side and relatively shallow corrugations on the other side, said deep corrugations comprising integral ribs extending at substantially right angles to the base, the said deep corrugations being formed of two thicknesses of rubber integrally connected to each other.

HENRY R. MINOR.